Oct. 22, 1968   R. D. HALL ETAL   3,407,069
CONTINUOUS STREAM BREWING PROCESS EMPLOYING
PERMEABLE YEAST PLUG
Filed Jan. 27, 1965   2 Sheets-Sheet 1
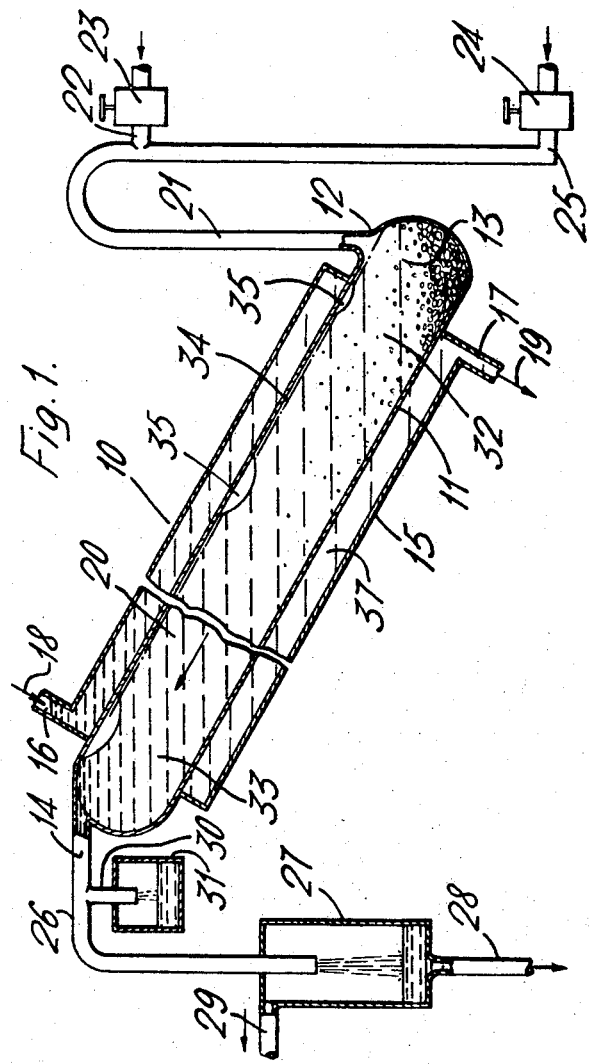
INVENTORS
RONALD DAVID HALL
GEORGE ALFRED HOWARD
BY
Bacon & Thomas
ATTORNEYS

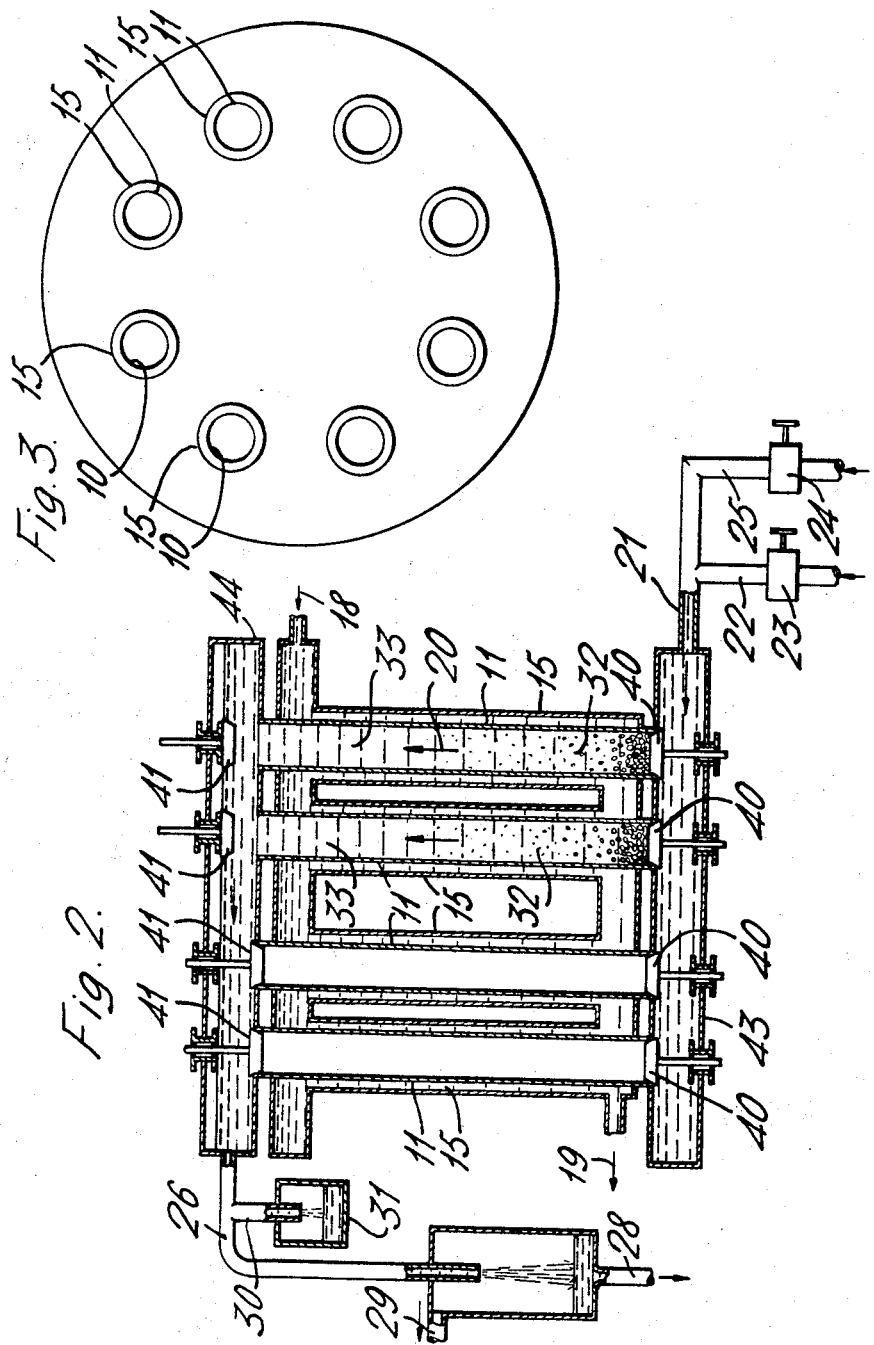

United States Patent Office 3,407,069
Patented Oct. 22, 1968

3,407,069
CONTINUOUS STREAM BREWING PROCESS EMPLOYING PERMEABLE YEAST PLUG
Ronald David Hall, Burton-on-Trent, and George Alfred Howard, Lymm, England, assignors to Allied Breweries Limited, London, England, a British company
Filed Jan. 27, 1965, Ser. No. 428,348
18 Claims. (Cl. 99—31)

ABSTRACT OF THE DISCLOSURE

A stream of wort is confined to flow upwardly along a sloping path and through a plug of yeast. The wort ferments and carries along some yeast and entrained bubbles which flow along the upper boundary of the stream until the yeast flocculates and returns to the plug along the lower stream boundary. Large gas bubbles or pressure pulsations are introduced to the stream to separate entrained bubbles from particles of yeast and thereby accelerate flocculation.

---

The present invention is concerned with fermentation of a fermentable liquid by yeast.

The invention has been developed primarily in connection with the fermentation of brewers wort to convert this into beer, but it will be understood that it may be applied to the production of other fermented liquors or as hereinafter described to the production or propagation of yeast.

Brewing of beer is most commonly carried out by a batch process which normally requires four to six days for its completion. This batch process involves four consecutive phases. Firstly the wort at 60° F. is inoculated with yeast and an aerobic phase continues for a period of about six to twelve hours, the yeast multiplying at the expense of nutrients in the wort. The first phase merges with the second phase which is one of rapid fermentation in conditions of depleted oxygen supply and when a high concentration of yeast has been obtained, alcohol and carbon dioxide gas being produced at the expense of the uptake of nutrients (principally carbohydrates) from the wort, temperature at this stage rising to 65° to 70° F., this phase occupying eighteen to twenty-four hours. The third phase covering a period of twelve to eighteen hours is one in which fermentation is slowly completed without further rise of temperature and following which the bulk of the yeast is removed. Finally in the fourth phase, the temperature of the beer is reduced to about 55° F. and remaining yeast is separated by sedimentation over a period of two to four days.

Proposals have been made for the carrying out of fermentation of brewers' wort continuously, as contrasting with the batch process, referred to above, and broadly comprise the continuous feeding of wort to and the concomitant removal of beer from a vessel containing yeast, the first and the last of the four phases referred to in the batch process being thereby eliminated. Specific proposals for continuous fermentation are of two main types. The first type is one referred to broadly as a stirred vessel system wherein wort is continuously added to and beer withdrawn from a vessel or a series of vessels containing yeast, the yeast being maintained in intimate contact with its substrate by agitation.

The disadvantages of this process are that the effluent from the vessel has essentially the same composition as the contents of the vessel, so that fermentation proceeds at low substrate concentration.

A second disadvantage is that for wort added to the vessel there is a wide range of residence times as contrasted with the situation existing in the batch system where all the wort receives the same treatment.

Thirdly, considerable quantities of yeast are removed continuously with the beer from the vessel, and the high yeast concentrations required for rapid beer production are not capable of being obtained except by continuously separating the yeast from the beer and returning it or some of it to the vessel, which procedure involves relatively complex separation procedures.

Fourthly, the stirring of the contents of the vessel requires the application of power which is necessarily dissipated in the vessel as heat which has to be removed.

Fifthly, precise control over the degree of aeration, which is desirable for efficient fermentation, is difficult to achieve.

The second type of continuous fermentation process which has been proposed is one in which the wort is fermented by yeast in a vessel divided into a series of compartments, by baffles designed to effect retention of the yeast for continuing fermentation of newly admitted wort, whilst permitting of cut-flow of the fermented wort.

One of the objections to this proposal is that baffles introduce mechanical complexity into the fermenter vessel and also render this difficult to clean out and sterilize.

Furthermore the presence of the baffles, inevitably results in the formation of pockets in the interior of the vessel and further problems are introduced as to how to maintain a proper flow of wort through all parts of these pockets.

One of the objects of the present invention is to avoid or reduce one or more of these disadvantages.

According to the present invention there is provided a continuous fermentation process involving fermentation of a fermentable liquid by yeast wherein the liquid is caused to flow along an ascending path through a liquid-permeable plug of yeast which is substantially unobstructed over its cross-sectional area and yeast which rises in the liquid is caused or permitted to flocculate within the flow path without being re-circulated externally thereof whereby the yeast is retained within the flow path.

The incoming liquid thus enters a region of high yeast concentration and the law of mass action ensures a high fermentation rate. This permits of a residence time which is much shorter than that necessary in batch processes.

For stability, the factors which promote agglomeration of the yeast and its retention in the flow path must predominate over those which promote dispersion and loss of yeast although the yeast is preferably maintained in a state of suspension within the plug. The tendency to agglomerate is determined by the flocculation characteristics of the yeast and is assisted by a substantially continuous decline in the pH and the carbohydrate content of the liquid along its flow path through the yeast plug.

The production and release of carbon dioxide by the yeast and the adhesion of this gas to the cells or clumps of cells of the yeast, tends to impart buoyancy to cause these to rise along the flow path and thereby promote dispersion of the yeast.

Similarly, violent agitation of the liquid in the flow path, high specific gravity of the liquid, and high flow rate of the liquid all tend to aid dispersion.

In carrying out the process, therefore, the conditions of operation are selected to ensure predominance of the factors promoting agglomeration over those promoting dispersion, of which the most important are selection of the yeast strain to provide the required degree of flocculation and removal of the generated bubbles or gas from the yeast particles.

The removal of gas bubbles may be effected by admitting gas to the flow path in quantities sufficient to form sweeping bubbles which travel along the flow path and collect or combine with the gas bubbles to be released.

The liquid may be caused to travel along a flow path which is inclined at an acute angle to the horizontal, for example between 9° and 45°.

The gas bubbles to be released may, in this case, advantageously be concentrated by the inclination of the flow path in the upper region of the cross-section of the flow path, and the sweeping bubbles then travel along this region to collect or combine with the gas bubbles to be released. The flow path, in this case, may be bounded at least at its upper side by a concave wall which forms an inverted channel in which the gas bubbles to be released tend to be concentrated (for example, the upper part of a tube of circular cross-section may form such a concave wall).

The sweeping bubbles may, at the point of their formation (that is to say at the point of their introduction into the flow path) be much larger in size than the gas bubbles to be released, so that they travel upwardly along the flow path by hydrostatic pressure without being arrested by viscosity or surface tension effects, or by being entrapped in the plug of yeast, and produce a local disturbance or pulsation in the liquid. It will be understood that the generated gas bubbles are usually of extremely small size, by virtue of the fact that they are "generated" gas bubbles, i.e. are formed by biochemical reactions involving molecules of the reacting substances. A typical size of sweeping bubble would be 1–10 ml. for a tube of say 1" in diameter and correspondingly larger bubbles for larger diameter tubes, this size increasing with ascent of the sweeping bubbles due to some collection of released bubbles as well as reduction in hydrostatic pressure.

An alternative expedient for releasing the gas bubbles is pulsating the liquid in the flow path by application of a pulsating pressure to the liquid in the flow path, as a whole. This may be done by applying vibrations to the liquid by a vibrating member in contact therewith, or by establishing pressure vibrations of gas adjoining the liquid in the flow path at its upper or lower ends.

The plug of yeast may, if desired, occupy only a part of the flow path, a yeast free, or substantially yeast free, region thus existing at the upper end of the flow path. In the upper end region of the flow path yeast carried upwards by its buoyancy in the rising liquid flocculates and returns to the plug. Flocculation may be caused solely by the lower specific gravity (carbohydrate concentration) and also pH of the liquid in the region immediately above the plug or by other means as described herein. Where the fermentation pathway is inclined to the horizontal, the yeast tends to rise principally along the uppermost wall of the pathway and flocculating yeast settles principally along the lower wall so that a circulating movement is imparted to the yeast. In order to maintain a low concentration of yeast cells passing out of the flow path, the upper region thereof may be continued beyond the point which is strictly required for the reassembly, flocculation and sinking of the yeast, this being appropriate in cases where the primary product intended to be produced by the process is the fermented liquid.

The cross-sectional dimensions of the flow path in any direction may be substantially less than the length of the flow path so that the quantity of yeast, which at any given time may be displaced by flow of liquid from the plug towards the upper end of the flow path, is exposed for a substantial period of time to conditions in which flocculation can take place, or adherent gas bubbles be removed, to effect thereby a return migration of the displaced quantity of yeast towards the yeast plug.

It will be understood that some oxygen (in the form of air) may and normally will be admitted to the flow path to travel upwardly along it. A low level of aeration has been found to stimulate fermentive activity without undesirable increase in yeast population.

The process may, however, be modified to admit a substantial quantity of oxygen to the liquid contained in the flow path to establish aerobic fermentation promoting yeast growth, and the yeast may be removed continuously or periodically from the flow path as constituting the primary product of the process.

The invention further resides in the provision of apparatus for carrying out a continuous fermentation process involving the fermentation of a fermentable liquid by yeast, and comprising a fermenter member affording an ascending passageway for containing the liquid and yeast and extending between an inlet for admitting liquid prior to fermentation thereof in the passageway and an outlet for out flow of the liquid after such fermentation, such passageway being free from baffles so as to define for the liquid a flow path which is unobstructed over its cross-section and means for promoting the establishment of a positionally-stable liquid-permeable yeast plug in the passageway at a position upstream of the outlet without recycling of the yeast externally of the passageway.

The apparatus may, for example, be provided with means for releasing gas bubbles generated by fermentation of the liquid along the flow path from the yeast to establish, in operation of the apparatus, a liquid permeable, positionally stable, yeast plug in the passageway.

Further features of the apparatus and method will be disclosed in, and their advantages will be apparent from, or will be specifically pointed out in, the following description given by way of example with reference to the accompanying drawings illustrating the invention and wherein:

FIGURE 1 is a diagrammatic view in side elevation of one form of apparatus for carrying out the method of the invention.

FIGURE 2 is a diagrammatic view in side elevation and partly in cross-section showing a further form of apparatus for carrying out the method of the invention and providing facilities for varying through-put of liquid, whilst maintaining constant or substantially constant operating conditions along a number of flow paths, and FIGURE 3 is a diagrammatic plan view in cross-section of the apparatus shown in FIGURE 2.

Referring firstly to the apparatus shown in FIGURE 1, this comprises a fermenter member 10 incorporating an inner fermenter tube 11, which is inclined to the horizontal at an acute angle and which, at its lower end, has an inlet fitting 12.

At the upper end the latter has an outlet fitting 14.

The tube 11 has associated with it a means for controlling the temperature of liquid contained within the tube. In the form of apparatus shown these means comprise a jacket 15, having an inlet 16 and an outlet 17 for the admission and exit of a heat transfer fluid flowing in the opposite direction to the liquid passing up the tube 11 as indicated by arrows 18, 19 and 20. It will however be understood that the character of the means may be varied as appropriate. Fermentation is an exothermic process and consequently the temperature controlling means may perform a heating duty over the region of the flow path nearest the inlet and a cooling duty over the region nearest the outlet. The heat transfer fluid may be either a liquid (such as water) or a gas (such as air).

Alternatively electrically energised heating means such as tape containing a resistive heating element may be employed where heating is required and to minimise heat loss in a region of the flow path between those previously mentioned.

The inlet fitting 12 is fed from an inlet pipe 21 rising to a level somewhat above the higher end of the tube 11, at which point a gas inlet pipe 22 and control valve 23, for regulating the flow of gas fed in as shown by the arrow, is provided.

At the lower end of the downwardly extending branch of the pipe 21 is an inlet pipe 25 for the liquid to be fermented and this again has its rate of flow controlled by a valve 24, which like the valve 25, can be regulated manually by means of a suitable control knob or handle or, if desired, automatically in response to a control signal.

The outlet fitting 14 feeds an outlet pipe 26, delivering into a chamber 27 for collection of the fermented liquid which can be led off through a pipe 28, whilst gas collecting in the chamber 27 can be fed out through a pipe 29, at the upper end thereof.

The outlet pipe 26 may also have a branch 30 feeding a removable sampling vessel 31.

Referring now to the general manner of carrying out the method using this apparatus for the production of beer from brewers' wort, yeast is introduced in any convenient manner into the fermenter tube 11 and wort is pumped into the wort inlet pipe and along the pipe 21 to emerge from the mouth 13 of the inlet fitting 12 and flow up the tube, as in the direction indicated by the arrow 20.

The conditions of operation should be so arranged that a plug of yeast is formed in the lower part of the tube, indicated generally at 32. The boundary of this plug, in the direction of the flow of liquid, is not abrupt. In practice the concentration of yeast decreases gradually along the length of the tube 11 towards its upper end, as indicated diagrammatically by the transverse full line shading the separation between the lines indicating a decreasing yeast population towards the upper end of the tube.

Fermentation of the wort reduces the specific gravity and pH of the wort, and yeast occupying the upper region 33 of the tube flocculates under these conditions, and the coherent yeast cells form clumps of higher specific gravity than the wort of this region, so that they sink or migrate towards the yeast plug region 32 and maintain the plug in being.

It will be evident that the rate of liquid flow in the direction of the arrow 20 must not be so great as to carry significant quantities of yeast out through the outlet pipe 26, although some yeast cells do, of course, pass out of the tube.

As previously mentioned in general terms, a further factor which tends to promote displacement of yeast towards the region 33 of the tube, is the generation of carbon dioxide gas occuring in the fermentation and which adheres to or becomes trapped between coherent cells.

When employing an inclined fermenter tube 11 wherby the cross-sectional shape may conveniently be circular, the upper region of the cross-section forms, in effect, an inverted channel and the generated gas bubbles tend to accumulate in this region, indicated at 34.

To release the gas bubbles from the yeast cells or clumps, the region 34 is swept by larger sized bubbles 35 which travel up the tube 11 from the inlet fitting 12, through which they are introduced.

These gas bubbles may be formed from gas introduced through the pipes 22 and 21, the former being fed from the pipe 29 with gas passing out of the fermenter tube. This gas is carbon dioxide, but some air may be introduced in the pipe 22 deliberately to promote yeast growth in the fermenter tube to maintain the yeast population, therein as a whole, substantially constant, it being understood that there will be some yeast loss as previously mentioned, due to cells passing out with the beer through the pipe 26.

The temperature of the contents of the tube may be controlled by the temperature of the heat transfer liquid 37 flowing downwardly in the space between the jacket 15 and the fermenter tube.

In carrying out the process of continuous fermentation utilising an apparatus in accordance with that shown in FIGURE 1, (with such modifications especially as to the inclination of the fermenter tube as are hereinafter described), the specific conditions of operation and results which have been obtained are now given in the following examples which are intended to be used as a guide in carrying out the process.

The main quantitive factors pertaining to the several examples are set out below in the following table. Other information pertaining to the several examples is set out below under the headings thereof:

| Example No. | 1 | 2 | 3 | 4 | 5 | 6 | 7 |
|---|---|---|---|---|---|---|---|
| Tube length (meters) | 9 | 9 | 7 | 4.3 | 3 | 3 | 4 |
| Tube diameter (m.m.) | 10 | 10 | 25.4 | 25.4 | 25.4 | 25.4 | 25.3 |
| Tube volume (approx.) liters | 0.7 | 0.7 | 3.55 | 2.2 | 1.75 | 1.75 | 1.75 |
| Tube inclination (degrees to horizontal) | 9 | 13 | 12 | 12 | 9, 21, 45 | 20 | 90 |
| Operating temperature of tube contents (° C.) | 25 | 25 | 25 | 25 | 25 | 25 | 25 |
| Specific gravity of wort at inlet | 1.032 | 1.032 | 1.031 | 1.047 | 1.031 | 1.031 | 1.031 |
| Specific gravity of beer at outlet | 1.010 | 1.010 | 1.010 | 1.018 | 1.010 | 1.031 | 1.011 |
| Rate of wort flow (ml./hr.) | 83 | 83 | 1,700 | 700 | 1,000 | 900 | 900 |
| Liquid residence time (hrs.) | 8.4 | 8.4 | 2.09 | 3.14 | 1.6 | 1.94 | 1.94 |
| Rate of recycled gas flow (ml./hr.) | | | | 1,400 | 1,500 | 1,500 | 1,750 | 1,750 |
| Rate of air flow (ml./hr.) | | | | 200 | 200 | 110 | 100 | 300 |
| Yeast cell contained in beer (cells/l.) | $0.25 \times 10^6$ | $0.25 \times 10^6$ | $2 \times 10^6$ | | | | |
| Yeast production, gm./per day (65%-70% moisture content) (pressed yeast) | | | | 172 | | 150-200 | |
| Bubbles per minute | | | 45 | 20-40 | 20-40 | 35 | 27 |
| Yeast content of tube (pressed yeast) in grams | | | | 800 | | 700-1,000 | 780 |
| $CO_2$ output (ml./hr.) | | | | | 1,0000 | 9,000 | 8,600-10,600 |

Example 1

A culture of yeast requisite to form the yeast plug was formed by actively growing yeast in wort passed into the bottom of the fermenter tube 11. Sterile air was blown continuously into the bottom of the fermenter tube after introduction of sufficient sterile wort to half-fill the fermenter tube.

In this particular example air was not admitted during the carrying out of the process after the formation of the yeast plug, but sterile worst was added continuously at a rate determined by the need to maintain the effluent at the specific gravity of beer and to retain the yeast in the fermenter tube.

Example 2

The process was carried out in the same manner as in Example 1 with the modification that instead of using a straight fermenter tube, the tube was coiled into a helix of 3½ complete turns, the angle of inclination being increased as indicated in the table.

Example 3

In this case the apparatus shown in FIGURE 1 was modified in that instead of using a single straight length of fermenter tube, five separate equal lengths was employed to form ascending runs of zig-zag form collectively as viewed in side elevation.

The beer contained yeast amounting to an average of 0.42% by weight of pressed yeast (moisture content 65% to 70%) and it will thus be evident that the process produced somewhat less yeast per unit volume of beer than a conventional batch fermentation.

The yeast escaped intermittently from the fermenter tube in large clumps (constituting the yeast output of the apparatus), but apart from this the yeast cell count in the beer was about $2 \times 10^6$ yeast cells per ml.

The total quantity of yeast contained in the fermenter tube was about 800 grammes of pressed yeast.

70% of the oxygen injected as air was absorbed at the air input rate specified in the table.

Example 4

The process carried out was similar to that described in Example 3 except for use of a wort having a different specific gravity at inlet and modification of the apparatus to employ only three straight lengths of tube in ascending zig-zag formation, instead of five.

The beer produced had quantitative characteristics as set out in the table.

Example 5

A single straight length of fermenter tube, as shown in FIGURE 1, was employed under operating conditions as quantitatively set out in the table. The process was satisfactorily operated with the fermenter tube at inclinations of 9°, 21° and 45° to the horizontal.

Example 6

The apparatus of FIGURE 1 was modified in the sense that the liquid flowing through the jacket 15 was replaced by a heating means comprising electrical heating tape wound onto the fermenter tube to maintain a temperature of 25° C. in the contents of the fermenter tube.

The beer produced had the quantitative characteristics as set out in the table.

The sweeping gas bubbles attained a size of 0.8 ml., each.

Example 7

The process was carried out in Example 6 except that the tube was moved into an upright position, that is to say 90° to the horizontal, and changes were made in the rate of air flow input, as indicated in the table.

The size of the sweeping bubbles increased to 1 ml.

In carrying out the process in accordance with these examples, the yeast selected was of a flocculating type and a particular yeast which was found satisfactory was that known as National Collection of Yeast Cultures No. 1026.

The process was operated satisfactorily for up to six weeks in each of the various forms of apparatus.

The beer produced by operation of the process, as set forth in each and all of the preceding examples had the quantitative characteristics set forth in the table, and was characterised by normal levels in qualitive characteristics such as flavour and in quantitive characteristics such as bitter-flavoured substances derived from hops, fuel oils and nitrogenous materials.

Referring now to FIGURES 2 and 3, there is shown diagrammatically therein a form of the apparatus intended for larger scale operation and designed to allow the rate of throughput to be varied without modification as to the operating conditions in individual flow paths.

Parts of this apparatus, which are equivalent to those of the apparatus in FIGURE 1, are indicated by like reference numerals.

The apparatus incorporates a plurality of fermenter tubes 11 which may be vertical or inclined at any acute angle to the horizontal, are arranged to occupy individual sectors, as viewed in plan (FIGURE 3). Any desired number of sectors may be brought into operation in accordance with the throughput requirements, that is to say the rate of flow of wort through the apparatus as a whole, and this may be achieved by providing flow control means which may be in the form of valves 40 at the inlet end of each fermenter tube or valves 41 at the outlet end of each fermenter tube, or if desired both of these sets of valves may be provided.

The inlet and outlet ends of the tubes may communicate respectively with inlet and outlet headers or chambers 43 and 44 and the valves may be operable by means of manually movable knobs or members on stems of the valves, movable through glands in the headers or chambers concerned, or the valves may be operated automatically by a programme device, if desired. By way of example, the valves associated with the tubes 11 contained in one sector are shown in their closed positions in FIGURE 2 and those of the tubes in another sector are shown in open positions permitting of the flow of wort through the tubes, as indicated by the arrows 20. The inlet passageway afforded between each open valve at the lower end of its associated tube is such that the rate of flow of wort prevents yeast or any appreciable quantity thereof entering the lower header.

The arrangement permits of periodic cleaning and sterilizing of individual tubes 11 or groups thereof contained in a particular sector, and for this purpose the headers concerned may be sub-divided by movable partitions to enable the particular sector of each header to be connected to a supply of sterilizing steam and shut off from communication with other sectors or chambers.

The general manner of operation of the apparatus is, as already described, in connection with FIGURE 1, namely a positionally stable and liquid permeable yeast plug is set up in the region 32 of each tube 11. The liquid flowing through the tube is thus brought into extensive contact with the yeast without obstruction by baffles or similar mechanical contrivances for maintaining the yeast in its proper position in the flow path. Such positioning of the yeast plug depends upon establishment of a dynamic balance between the factors promoting yeast displacement towards the outlet end of the tube and sinking or migration of the yeast towards the plug region, the latter factors should predominate for stability.

The rate of fermention may, if desired, be measured by detecting the quantity of carbon dioxide emerging from the fermenter tube, or each of same, or from the apparatus as a whole, in the case of FIGURE 2, and conditions may be adjusted in accordance with a signal derived from such measurement, which may be used to control both the rate of inflow of wort (in this case the adjustment being performed automatically) or on the rate of admission of gas (by adjustment of the valve 23).

The temperature of operation may also be adjusted by raising or lowering the temperature of the fluid (water or air) admitted to the jackets 15. Generally higher temperatures of operation may be utilised in the continuous process of fermentation herein described in comparison with those utilised in batch processes.

One of the principal advantages of the apparatus, apart from those which follow from the elimination of baffles or the like structures, is the extremely short residence time of the liquid in the fermenter tube or each of same, which, as will be evident from the table, is in the range one to four hours.

Apart from the pumps necessary to achieve flow of the wort and recycling of the carbon dioxide gas, the energy required to operate the apparatus is low, thereby achieving good overall thermal efficiency and avoidance of problems inherent in heat dissipation which arise in the proposed stirred vessel type of continuous process.

The sweeping of the column of wort contained in each fermenter tube by sweeping gas bubbles, collects and carries away the generated gas bubbles partly, as already indicated by the combining or collection of these generated gas bubbles by the larger sized sweeping bubbles and partly by the physical disturbance or pulsing of the liquid column which results from the upward passage of the sweeping bubbles, and which tends to break the adherence of the generated gas bubbles to yeast cells or clumps and to reduce the opposition to ascent of the generated gas bubbles by surface tension effects and the viscosity of wort.

Such pulsation may be applied by other means either in substitution of the use of sweeping bubbles or additionally thereto.

The pulsation may be applied by imparting pressure pulses to the gas contained in the fermenter tube or associated header or outlet tube at the upper end of each column of wort, by means of a suitable pulse generator connected thereto. Alternatively the pulsations may be applied mechanically by means of a diaphragm in contact with the liquid column itself, for example, the lower end of each fermenter tube may be so arranged that it does not obstruct the flow of wort along the ascending flow path afforded by the tube.

In any case where it is desired to operate the process to produce yeast growth as a primary or additional product, appropriate quantities of oxygen in the form of air would be admitted to the fermenter tube and yeast would be removed periodically or intermittently. This might be done by providing an outlet at the lower end of the fermenter tube, having a valve which is normally closed but is opened periodically to permit of out flow of yeast or alternatively the rate of flow of wort may be increased to carry yeast out from the upper end of the fermenter tube.

What is claimed is:

1. The process of continuously fermenting a fermentable liquid by yeast, comprising the steps of: establishing a flowing stream to said liquid and confining said stream to flow along an unobstructed ascending flow path sloping at an acute angle to the horizontal; providing a liquid permeable plug of yeast in at least the lower end portion of the said path whereby said stream flows through said plug and thereby yeast rising with said stream seeks the upper lateral boundary of said path, flocculates from said liquid in the upper end portion thereof and descends to said plug within and along the lower lateral boundary of said path.

2. The process of claim 1 wherein said yeast is a strain of yeast capable of spontaneous flocculation in said liquid.

3. The process of claim 1 including the step of removing buoyancy-imparting gas bubbles from yeast rising toward said upper end portion thereby assisting fluocculation of said yeast.

4. The process of claim 3 wherein said step of removing said gas bubbles is performed by admitting gas to said stream to flow therewith and form sweeping bubbles to collect the gas bubbles to be removed.

5. The process of claim 3 wherein said step of removing said gas bubbles from said yeast is performed by admitting gas to said stream in a region to cause sweeping bubbles thereof to rise along said upper lateral boundary and thereby combine with gas bubbles to be removed.

6. The process of claim 5 wherein said upper lateral boundary is maintained in the form of an inverted channel in which the gas bubbles to be removed tend to be concentrated.

7. The process of claim 5 wherein said gas is admitted to said stream in a manner to form sweeping bubbles much larger in size than the gas bubbles to be removed and so they travel along said stream by hydrostatic pressure without being arrested by viscosity or surface tension effects or by being entrapped in said plug of yeast and which produce local disturbances in the liquid.

8. The process of claim 3 wherein said gas bubbles are removed from said yeast by applying a pulsating pressure to the liquid in said flow path.

9. The process of claim 1 wherein said flow path is of such length that said plug of yeast occupies only a part of said path, a substantially yeast-free region existing at the said upper end portion thereof.

10. The process of claim 1 wherein any cross-sectional dimension of said flow path is substantially less than the length of said path whereby any yeast displaced by flow of said liquid is subject to flocculation for a substantial period of time.

11. The process of claim 1 wherein said fermentable liquid is brewer's wort and the fermented product is beer.

12. The process of claim 4 wherein said admitted gas is a gas selected to maintain anaerobic fermentation of said liquid.

13. The process of claim 12 wherein said admitted gas is carbon dioxide derived from that generated by fermentation in said flow path.

14. The process of claim 1 including the step of controlling the temperature of said liquid along at least a part of said flow path.

15. The process of claim 1 wherein the concentration of carbohydrate in the fermentable liquid is caused to decline continuously along said path through said plug.

16. The process of claim 1 wherein said yeast comprises yeast cells maintained in suspension in said liquid.

17. The process of claim 1 including the step of: admitting oxygen to said stream to establish aerobic fermentation and yeast growth; and at least periodically removing yeast from said flow path.

18. The process of claim 1 wherein said yeast plug comprises a high concentration of yeast cells in said flow path.

References Cited

UNITED STATES PATENTS 3,345,179   10/1967   Pollock et al. _____ 99—31

FOREIGN PATENTS 938,173   10/1963   Great Britain.
959,049    5/1964   Great Britain.

A. LOUIS MONACELL, *Primary Examiner.*

D. M. NAFF, *Assistant Examiner.*